Sept. 16, 1969  S. A. LAURICH  3,467,724
p-XYLENE PROCESS
Filed June 15, 1966

INVENTOR
STEPHEN A. LAURICH
BY
ATTORNEYS

United States Patent Office 3,467,724
Patented Sept. 16, 1969

3,467,724
p-XYLENE PROCESS
Stephen A. Laurich, Warren, Pa., assignor to Chevron Research Company, San Francisco, Calif., a corporation of Delaware
Filed June 15, 1966, Ser. No. 557,761
Int. Cl. B01d 9/04; C07c 15/08
U.S. Cl. 260—674     12 Claims

ABSTRACT OF THE DISCLOSURE

Continuous crystallization process for the recovery of p-xylene from isomeric xylene mixtures. A body of a slurry of p-xylene crystals and mother liquor is circulated in a cyclical flow path and maintained at a p-xylene crystal-forming temperature and minor amounts of fresh feed and an inert fluid refrigerant are introduced therein. Crystal fines normally associated with shock cooling and supercooling are thereby avoided.

---

Figure 1:
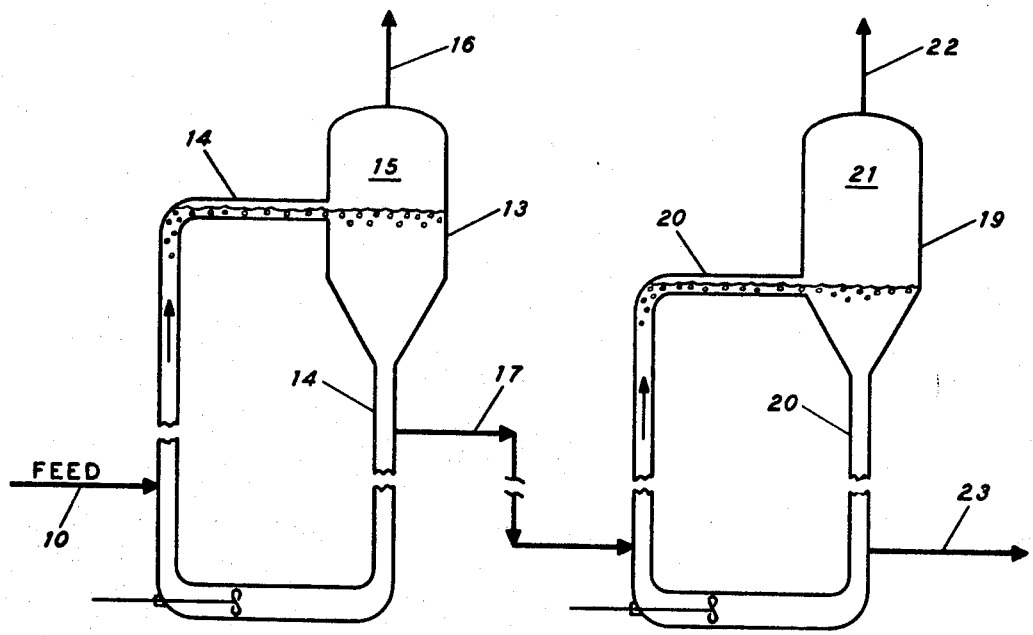

This invention relates to a process for the recovery of a p-xylene from hydrocarbon mixtures. More particularly it relates to an improved process for the recovery of p-xylene by fractional crystallization from p-xylene-rich hydrocarbon mixtures. Still more particularly, it relates to a method for growing p-xylene crystals having substantially improved particle sizing.

The requirements of the chemical industry for p-xylene continue to increase at a large rate. A further requirement is the demand for ever higher purity. In order to meet these demands and to efficiently recover p-xylene, process improvements in the conventional fractional p-xylene crystallization methods are required because to date no other kind of separation process appears to be practicable.

A serious limitation with regard to purity and yield in conventional p-xylene fractional crystallization methods is believed to be the matter of poor crystal sizing. Small crystals are difficult to separate efficiently. They also retain proportionately larger amounts of impurity.

Among the means considered by the art as solutions to the crystal sizing problem is the use of long holding times, for example 4 to 18 hours (cf. U.S. 3,177,265); the use of slow moving scraped chillers and a circulating slurry (cf. U.S. 2,833,835); and acceptance of relatively poor sizing but with back-up by use of an extensive product purification train (cf. U.S. 2,985,694) and the like. All of the foregoing and similar solutions are relatively unsatisfactory.

Long holding times and complicated purification trains are obviously burdensome. Scraped chillers are in general costly mechanical elements requiring substantial care and maintenance and are difficult to scale up for large volume production. Moreover, no matter how slow the scraper moves, serious problems are inherent in their use, including undesirable excessive crystal nucleation, inherent mother-liquor entrapment in the scraped product crystal cake and in particular heat transfer problems inherent in the use of heat exchangers where a developing crystal cake acts as insulation between a solution to be cooled and the cooling medium. These and other problems are fully obviated or substantially improved in the instant process.

It has now been found that p-xylene can be efficiently and conveniently crystallized from a normally liquid xylene-containing hydrocarbon feed from which p-xylene crystals separate as the first solid formed when the feed mixture is cooled to a crystallization temperature. In the process a slurry of p-xlene crystals is obtained by cooling a portion of the feed to a temperature in the range below the incipient p-xylene crystallization temperature of the feed and above about −140° F., and while maintaining this temperature a body of the resulting slurry is circulated in a crystallization zone adapted to provide elongated cyclical flow. Fresh feed is introduced into the circulating slurry at a first portion of the zone at a rate based upon the volume of the body of slurry in the range below about 10 percent per minute, and along with the feed or at a separate lower portion of the zone inert fluid refrigerant is also introduced into the slurry in an amount based upon parts by weight of feed in the range from about 0.1 to 1 part. At a suitable portion of the crystallization zone at least a portion of the added refrigerant is vaporized and withdrawn, thereby cooling the slurry a minor amount causing p-xylene crystals in the slurry to grow substantially in size and also generating a limited amount of new p-xylene crystal nuclei. Simultaneous to the above noted additions, slurry is withdrawn from the zone at a separate portion thereof in an amount and rate sufficient to maintain the circulating body of slurry. The resulting p-xylene crystals are large and easily filtered from the mother liquor. By conventional means, the p-xylene crystals are separated from the mother liquor and the resulting crystal cakes are of such greatly improved purities that after but a single subsequent reslurry and a single wash final p-xylene products of at least 99 percent purity are conveniently and efficiently obtained.

In the subject process the rate of introduction of fresh p-xylene-containing feed into the circulating slurry must be controlled such that the amount of fresh feed relative to slurry is less than about 10 volumes per 100 volumes of slurry. That is to say, the ratio of the slurry circulation rate (units of slurry per unit time) to the fresh feed rate (units of feed per unit time) should be at least 10. For purposes of convenience the ratio is herein defined as the "operating ratio." When the operating ratio is appreciably less than 10, the process is unsatisfactory. On the other hand, very high operating ratios are undesirable because of economic factors. In general useful operating ratios are in the range from 10 to 1000; the preferred feed rates correspond to operating ratios in the range from about 50 to 500.

Under the conditions of the present process, average residence times in the crystallization zone can be as short as 10 minutes and yet the resulting average p-xylene crystal sizing is surprisingly markedly improved, being 5–10 times larger than previously enjoyed in known comparable commercially practicable processes, thereby making possible substantial improvements in yield, product purity, and surprisingly substantially increased process efficiency.

In general, any normally liquid hydrocarbon mixture from which p-xylene first crystallizes when cooled is a suitable feed. Preferable feeds are mixtures which are substantially composed of the $C_8$ aromatic hydrocarbons having at least about a 10% p-xylene content. Industrial xylene mixtures are particularly contemplated process feeds, including distillate fractions and solvent refined fractions of coke-oven distillates and aromatized refinery naphtha cuts, catalytically equilibrated $C_8$ aromatic hydrocarbon fractions, and the like. Mixtures comprised mainly of p-xylene and m-xylene are particularly useful. In general, useful p-xylene feeds will contain at least about 10 weight percent of p-xylene. Aliphatic hydrocarbon impurities can be tolerated but are undesirable when present in excessive amounts, for example, 20 volume percent and higher.

By a crystallization zone adapted to provide elongated cyclical flow is meant the class of conformations which establish repetitive fluid flow patterns in which the fluid flow is directed and returns to an origin. Hollow torroidal doughnut-like shapes are particular examples. (See for example FIGURE 1 attached.) Similarly, volumes of evolution defined by the revolution of a closed regular and irregular planar figure, e.g., a circle, ellipse, square, rectangle and the like, about a closed linear path are other examples. Others are concentric pipes of suitable diameters and the like. (See for example FIGURE 2 attached.)

By definition, the term "circulate crystallization zone" when used herein relates to the aforedescribed crystallization zones.

By an inert fluid refrigerant is meant in general fluids capable of undergoing the low-temperature refrigeration cycle (see for example Encyclopedia of Chemical Technology, Kirk-Othmer, volume XI, pp. 633–44) at a temperature within the temperature range from about −32° F. down to about −238° F. and at a pressure within the range from about 0.1 atmosphere up to about 10 atmospheres. The term "inert" refers to lack of appreciable chemical reactivity to the system in general and to corrosiveness to the materials of construction in particular. Representative useful refrigerants are carbon dioxide, ammonia, lower hydrocarbons such as methane, ethane, propane, propene, ethene, butane, butenes and the like, as well as the Freon compounds, sulfur dioxide and the like. Desirably, the refrigerant used should have a latent heat of evaporation of at least about 50 calories (15° C.) per gram. Carbon diozide is preferred for reasons of safety.

The amount of refrigerant desirably added to the slurry depends upon several factors; the more significant includes the circulating slurry temperature, that of the incoming feed, the amount of p-xylene to be crystallized and the latent heat of evaporation of the specific refrigerant being used. These are conventional heat balance type considerations.

Figure 2:
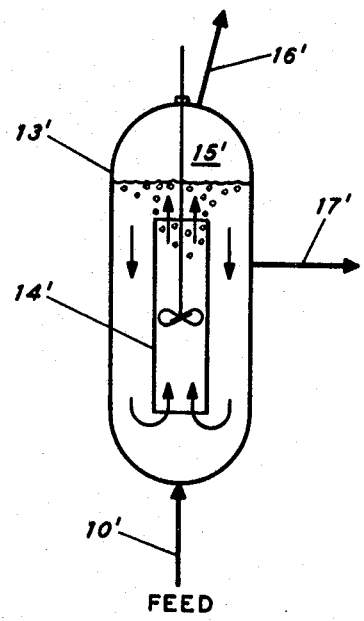

In a single-stage crystallization process embodiment, i.e., using only the first stage as shown in FIGURE 1 attached, the chosen slurry temperature is desirably about the eutectic temperature of the specific feed used in order to recover substantially all of the available p-xylene in the feed. On the other hand, in a preferred embodiment as described infra, where a second-stage circulating slurry is also used under an imposed subatmospheric pressure, a somewhat smaller amount of refrigerant is desirably used because under reduced pressure conditions for each unit weight of added refrigerant more of it is evaporated from the circulating slurry, thus providing a larger cooling capacity per unit weight of added refrigerant and hence a more efficient process. In general, from about 0.1 to 1.0 part of carbon dioxide per each part of fresh feed added to the slurry is desirably used. For other suitable refrigerants, the useful range varies depending upon the relative latent heats of vaporization. For example, in using a refrigerant having a latent heat value twice that of carbon dioxide, just one-half as much weight is required, i.e., a corresponding range of 0.05 to 0.5 part etc.

The fluid refrigerant may be added in admixture with the fresh feed or separately. Preferably the introduction is made at a lower portion of the circulate crystallization zone.

The temperature of the fresh feed added to the slurry should be above the temperature of first p-xylene crystal formation for the specific feed for the reason that when crystallization is effected outside the circulating slurry the crystals are small and difficult to filter. Usually somewhat higher feed temperatures are often more conveniently used although correspondingly larger relative amounts of refrigerant are then required for the additional cooling. In general, useful temperatures for conventional p-xylene-containing feeds will be in the range from about −10° F. to about −60° F. Feeds which contain smaller relative amounts of p-xylene can be fed at relatively lower temperatures.

In a correlative sense, the subject process can be described in terms of two parameters, that is, (1) the solid p-xylene content in the circulating slurry and (2) the amount of supercooling of the slurry. In a preferred description of the invention using these terms, the aforedescribed p-xylene containing feed is introduced into a circulate crystallization zone and cooled to a temperature in the range from about the eutectic to about 30° C. above the eutectic temperature of the feed and sufficient to produce at least about 5% of solid crystalline p-xylene in the resulting slurry (percent based upon total weight of mother liquor and solid). The resulting body of slurry is then circulated in the crystallization zone, and fresh feed and fluid refrigerant are introduced conjointly or separately at a lower portion into the slurry; and at a separate portion of the zone at least a fraction of the added refrigerant is vaporized thereby tending to cool the slurry, which is maintained at substantially the above noted slurry body temperature by limiting supercooling of the slurry to less than about 5° F.

By supercooling in terms of a temperature differential as used herein is meant the temperature difference between the actual temperature of any given supersaturated p-xylene solution and the temperature at which a solution of that same composition is in equilibrium with solid p-xylene crystals. Preferably, in the present process, supercooling should not exceed about 2.0° F. If there is no supercooling, there is, of course, no crystallization potential. Therefore as a practical matter, at least about 0.05° F. of supercooling is desirable. If supercooling exceeds about 5° F., little or no advantage results in the crystal sizing relative to conventional stirred tank operations.

In describing relative amounts prescribed herein, the term "parts" as used refers to parts by weight unless otherwise stated.

The appended drawing, FIGURE I, illustrates a preferred embodiment of the instant process. Two circulating slurry zones are employed. In the first, the application of a superatmospheric system pressure facilitates the introduction of liquid refrigerant and process control. In the second, the application of a subatmospheric pressure facilitates efficient use and recovery of the refrigerant. In each zone, the circulating slurry and internal refrigerant are required in order to achieve the kind of controlled p-xylene crystallization which results in satisfactory crystal sizing.

The recrystallization zones comprise the torroidal recirculation loops of insulated pipe, 14 and 20 and the associated liquid filled portions of vessels 13 and 19. The major axes of the loops, 14 and 20, are in the vertical plane, and the respective heights are 30 and 26 feet. Pipes 14 and 20 have a diameter of 10 inches. Vaporization zones 15 and 21 are in direct association with portions of the aforedescribed crystallization zones. These vaporization zones are sized to permit efficient separation of gas and liquid phases. In zone 15 the height is approximately equal to the diameter of vessel 13; and in zone 21 the height is about twice the diameter of vessel 19.

In the established operating mode using a $C_8$ aromatic hydrocarbon feed containing about 20% p-xylene, the following approximate process conditions prevail as indicated.

|  | Crystallizer 14 | Crystallizer 20 |
| --- | --- | --- |
| Temperature, °F | −81 | −102 |
| Dissolved $CO_2$, Percent | 13 | 3 |
| Solid p-xylene, percent | 10 | 15 |
| Pressure, p.s.i.a., $CO_2$: |  |  |
| Zone 15 | 35 |  |
| Zone 21 |  | 6 |

Start-up is not a particular problem and may be effected in a variety of ways. The most convenient is to charge feed to crystallizer 14, commence circulation in the loop and pump liquid carbon dioxide at a rate based upon circulating feed of about 1 percent per minute while maintaining pressure in zone 15 at about 35 p.s.i.a. until the slurry temperature is about −81° F.

Then via line 10 fresh feed containing about 0.3 part of dissolved carbon dioxide for each part of feed is introduced into crystallizer 14 at a rate of about 1 part per 100 parts of circulating slurry. Usually, the feed is a mixture of a typical $C_8$ aromatic hydrocarbon refinery stream containing about 20% p-xylene with the balance being m-xylene plus o-xylene, ethylbenzene, and lesser amounts of aliphatic hydrocarbon impurities.

The foregoing addition of fresh feed to the slurry is desirably made at a lower portion of crystallizer 14, permitting substantially complete intermixing of circulating slurry and feed before any appreciable vaporization of the refrigerant occurs.

As the circulating slurry and freshly added feed plus dissolved refrigerant in crystallizer 14 progresses up the crystallization loop, the pressure upon the solution lessens until the bubble point of solution is reached and bubbles of refrigerant form intermediate the junction of line 10 with crystallizer 14 and the vapor-liquid phase boundary in zone 15, thereby contributing to the control of the refrigerant vaporization and consequent slurry cooling required in turn to control supercooling. Vaporized carbon dioxide is withdrawn from zone 15 via line 16 for recovery and reuse in the process. The downcoming slurry contains about 12.5 percent dissolved refrigerant and a solid p-xylene content of about 9.6 weight percent consisting of a minor amount of newly generated p-xylene crystal nuclei, and enlarged p-xylene crystals.

At a lower portion of crystallizer 14 via line 17 after an average residence time of about 30 minutes slurry is withdrawn from crystallizer 14 and introduced into the circulating slurry in crystallizer 20 at a lower portion thereof at a rate not exceeding about 20 volume percent per minute (based upon volume of circulating slurry in zone 20). In progressing up the loop, there is again a pressure gradient, carbon dioxide refrigerant is evaporated, and heat energy is withdrawn from the slurry facilitated by maintaining a pressure of about 6 p.s.i.a. in zone 21 of vessel 19. The evaporated carbon dioxide is withdrawn from zone 21 via line 22 for recovery and reuse in the process. After passing through vaporization zone 21, the downcoming slurry has a temperature of about −102° F., i.e., substantially the eutectic temperature of the feed, has a carbon dioxide content of about 2.5 weight percent, and has a p-xylene solid content of about 15.5 weight percent. Via line 23 slurry is withdrawn from cystallizer 20 and passed to a suitable liquid-solid separator, for example, a centrifuge or a filter system. The p-xylene crystals produced in the aforedescribed manner are large and are easily filtered. Mother liquor retention is minimal, and loss of p-xylene in the form of fine microcrystals to the mother liquor is substantially reduced relative to conventional operation.

The attached figure is but a schematic drawing, and it is obvious that pumps, exchangers, ancillary lines and the like have been omitted for simplicity and can readily be supplied by one skilled in the art.

In the foregoing embodiment employing liquid or dissolved carbon dioxide the p-xylene crystallization is conveniently separated into two stages making possible more efficient use of the refrigerant. On the other hand, a single circulation zone or stage can be employed, for example, where recovery of refrigerant and reuse is not contemplated or desirable, and wherein the circulating slurry is desirably maintained at substantially the eutectic temperature.

In single crystallization stage embodiments of this process and in the final stage of multicrystallization stage embodiments, the temperature of the circulating slurry should be substantially the eutectic temperature of the particular feed. Operation at any appreciably higher temperature would, of course, be less efficient in regard to p-xylene recovery. On the other hand, there is usually some gain of heat energy by the slurry during transfer to the separation system and in the separation procedure as well. Therefore, the crystallization temperature used in a single stage process or the final stage of a multistage process is frequently a few degrees below the eutectic, and a minor amount, possibly 1 to 5 weight percent, of the eutectic mixture is also precipitated. Eutectic mixtures melt first taking up most of the heat gain. Such heat compensated crystallizations are best controlled by regulation of the amount of refrigerant introduced into the system.

The published literature disclosing eutectic temperatures and phase composition diagrams for all practicable p-xylene-rich feeds is extensive. No particular pupose therefore would be served herein to consider this aspect at any length. In general, useful p-xylene containing feeds have eutectic temperatures in the range from about −22° F. to −140° F.

Where more than one crystallization stage is used in an embodiment of the process, the temperature of the first crystallization stage, i.e., first relative to incoming fresh feed, should be sufficient to produce at least about 1 weight percent of solid p-xylene in the resulting slurry. That is to say, at least about 1 weight percent of p-xylene crystals are required in the process in order to obtain any appreciable control of nucleation in the circulating slurry. Preferably, at least the presence of about 5 to 10 weight percent of solid p-xylene is desirable in the slurry for satisfactory control. In general, with usual p-xylene-rich feeds, this establishes useful first crystallization temperatures in the range from about 10° F. to 54° F. above the eutectic temperature.

Practicable operating pressures for the process are in general in the range from about 0.1 atmosphere up to about 5 atmospheres, depending upon the particular refrigerant being employed and whether a single or multiple stage crystallizaiton process is employed.

COMPARISON WITH PRIOR ART

Examples 1–2

For purposes of comparison p-xylene was crystallized (1) by a conventional commercial stirred holding tank method and (2) by the circulating slurry system described above using two stages. The feed in each instance was the same and was $C_8$ aromatic hydrocarbon containing 19% of p-xylene. Liquid carbon dioxide refrigerant was used.

From a visual examination, the crystals of the present process were clearly 5 to 10 times larger. As a practical demonstration, however, both slurries were separated under essentially equivalent conditions, i.e.:

A Bird 18″ x 28″ Screen bowl centrifuge.
Inlet temperature: −94 to −96° F.
Cake retention time: 11 seconds.
Feed rate: 6800 lbs./hr.
Mechanical conditions—essentially identical with the following results:

|  | 1 | 2 |
| --- | --- | --- |
|  | Directed flow Circulating Slurry | Stirred Tank |
| p-Xylene content of cake, percent | 85 | 73 |
| Retained mother liquor, percent of cake | 16 | 30 |
| Solid p-xylene in reject mother liquor, percent | ~0 | 2.6 |
| p-Xylene recovery from feed, percent theory [a] | ~100 | 80 |

[a] Amount of p-xylene crystallizable before eutectic mixture forms.

The foregoing comparative runs clearly demonstrate substantial practical advantages of the subject circulating slurry process. In particular, losses of p-xylene to reject mother liquor streams are essentially eliminated, and, secondly, the roughly halving of retained mother liquor on the cake means a much reduced subsequent purification burden. Using the present circulating slurry crystallization process, p-xylene product streams having purities in excess of 99% are readily and efficiently obtainable.

Another and particular advantage of the subject directed flow circulating slurry process using internal refrigerants as opposed to indirect cooling is the absence of any appreciable deposition of solid p-xylene on the walls of the crystallization zone.

A still further advantage of the subject process resides in the ease with which it can be scaled up or down to fit the needs of a particular feed situation.

VARIATION OF PRESSURE IN SUPERATMOSPHERIC PRESSURE STAGE

Examples 3–6

In a two-stage essentially pressure regulated exemplification of the instant process a $C_8$ aromatic hydrocarbon feed containing 24.5±1 volume percent of p-xylene was fractionally crystallized. While maintaining conditions in the subatmospheric pressure second stage essentially constant, i.e., Temperature, °F. _____ −98 to −100
Pressure, p.s.i.a. _____ 5–6 and likewise while maintaining slurry separation conditions essentially constant as in Example 1, the pressure was varied in the first stage crystallizer under the below indicated conditions with the following results:

Conditions—
  Feed rate, lbs./hr./gal. crystallizer
    volume _____ 6.9–7.7
  $CO_2$ ratio, lbs./lb. feed _____ 0.36–0.45
  Ratio, circulating slurry to feed, lbs./lb. _ 97–108

| Example No. | 3 | 4 | 5 |
|---|---|---|---|
| Variable, pressure, p.s.i.g. | 5 | 20 | 30 |
| Results: | | | |
| Temperature, °F. | −92 | −80 | −74 |
| Supercooling, °F. | 1.36 | 1.25 | 1.06 |
| Slurry solids content, wt. percent | 15.8 | 13.3 | 11.0 |
| p-Xylene crystal cake, purity percent | 75 | 82 | 82 |

The above data demonstrate in particular the use of applied system pressure as a variable means to improve p-xylene crystallization in the instant circulating slurry process. With increasing pressure in the first stage supercooling becomes less.

EFFECT OF XYLENE CONCENTRATION IN FEED

Examples 6–9

A series of experimental runs was carried out analogous to Example 2 in which the p-xylene content of the $C_8$ aromatic hydrocarbon feed was varied over the range 16.4 to 31.5 weight percent. The ratio of carbon dioxide to feed, lbs./lb., was varied in the range 0.28 to 0.51 in order to maintain the other conditions essentially constant as follows:

Conditions—
  (A) In Subatmospheric Pressure Second Stage:
    Temperature, °F. _____ −98 to −100
    Pressure, p.s.i.a. _____ 5–6
  (B) In Superatmospheric First Stage:
    Feed rate, lbs./hr./gal. crystallizer
      volume _____ 6.9–7.4
    Ratio, circulating slurry to feed,
      lb./lb. _____ 100–108
    Pressure, p.s.i.g. _____ 20
    Temperature, °F. _____ −80

| Example No. | 6 | 7 | 8 | 9 |
|---|---|---|---|---|
| Variable, p-xylene content of feed, percent | 16 | 20 | 24 | 32 |
| Results: | | | | |
| Supercooling, °F. | 0.53 | 0.68 | 1.25 | 1.68 |
| Slurry, solid p-xylene content, wt. percent | 5.0 | 8.5 | 13.3 | 19.8 |
| p-Xylene crystal cake purity, percent | 75 | 79 | 82 | 84 |

These data demonstrate that the purity of the p-xylene product crystal cake is considerably affected by the concentration of p-xylene in the feed. In a conventional re-slurry follow-up treat of crude p-xylene cake (cf. U.S. 2,985,694) three to four p-xylene enriched mother liquor reslurry operations are required to obtain about a 99% purity product. Due to the improved p-xylene crystal sizing obtained by the subject process, the product obtained after but one or two such reslurry operations is 99+ percent pure p-xylene.

These data, Examples 6–9, inclusive, suggest that in the case of rather dilute feeds, i.e., less than about 15% p-xylene content, feed enrichment by recycle of an appreciable amount of product should be advantageous. In effect a p-xylene "flywheel" is generated by adding p-xylene to a dilute feed resulting in larger crystals and a higher purity product. Surprisingly, the following examples, wherein the feed was enriched to about a 20% p-xylene content, show that introduction of the enriching p-xylene is preferably made into the fresh feed rather than directly into the slurry. These examples were carried out substantially as in Example 8. However, while the net p-xylene content of the feed was essentially equal (20 and 19%), in one case (Example 10) a 70% p-xylene stream was combined with a more dilute feed and the resulting mixture was injected in the circulating slurry while in the other, Run No. 11, the same relative amounts of 70% feed and dilute feed were introduced separately into the slurry with the following results noted:

| Example No. | 10 | 11 |
|---|---|---|
| Mode of addition of feed | (¹) | (²) |
| Total percent p-xylene in feed(s) | 19 | 20 |
| Supercooling, °F. | 0.51 | 0.50 |
| Cake purity, percent p-xylene | 84 | 81 |

¹ Combined.
² Separate.

The above data demonstrate that p-xylene enriched mother-liquor and p-xylene additions for slurry enrichment are desirably made indirectly by addition to the relatively dilute feed rather than directly into the slurry.

EFFECT OF OPERATING RATIO

The operating ratio of the process, that is the ratio of the circulation rate to the feed rate, can be varied as a means to improve p-xylene crystallization in the instant process. The following examples were carried out as in Example 3 above:

Conditions—
  (A) In the Subatmospheric Pressure Second Stage:
    Temperature, °F. _____ −95 to −100
    Pressure, p.s.i.a. _____ 6
  (B) In the Superatmospheric Pressure First Stage:
    Feed rate, lbs./hr./gal. crystallizer
      volume _____ 4.0–5.0
    $CO_2$ rate, lb./lb. feed _____ 0.29–0.40
    Feed, p-xylene content, percent _ 19.7–20.8
    Pressure, p.s.i.g. _____ 20
    Temperature, °F. _____ −81 to −82

| Example No. | 12 | 13 | 14 |
|---|---|---|---|
| Variable, Operating Ratio | 164 | 196 | 246 |
| Supercooling, °F. | 0.51 | 0.53 | 0.24 |
| Results: p-xylene crystal cake purity, percent | 81 | 85 | 91 |

The above examples, 12–14, demonstrate the substantial advantage gained by increasing the operating ratio in a directed flow crystallization zone process. Taken in further consideration of the prior examples, these examples suggest the combination use of pressure and circulation effects as means for obtaining greatly improved results in the subject circulating slurry p-xylene crystallization process.

EFFECT OF FEED AND SLURRY CIRCULATION RATES

The effect of varying the feed rate and slurry circulation rate is demonstrated in the following examples carried out as in Example 3:

Conditions—
- (A) In the Subatmospheric Pressure Stage:
  - Temperature, °F. _____ −95 to −100
  - Pressure, p.s.i.a. _____ 6
- (B) In the Superatmospheric Pressure Stage:
  - Pressure, p.s.i.g. _____ 20
  - Feed, percent p-xylene (±1) _____ 19.8
  - $CO_2$, lb./lb. feed _____ .26–.29

| Example | 16 | 17 | 18 | 19 | 20 | 21 | 22 |
|---|---|---|---|---|---|---|---|
| Variable: | | | | | | | |
| Feed, rate lb./hr./gal | 4.5 | 6.9 | 5.4 | 15.3 | 5.7 | 8.0 | 11.4 |
| Slurry circulation rate, lbs./hr./gal. | 1,100 | 1,100 | 1,000 | 1,000 | 750 | 700 | 750 |
| Turnovers/min.[1] | 2.3 | 2.3 | 2.1 | 2.1 | 1.6 | 1.6 | 1.6 |
| Resulting Variables: | | | | | | | |
| Slurry temperature, °F | −81 | −82 | −84 | −80 | −84 | −79 | −78 |
| Residence time, min | 106 | 71 | 91 | 33 | 85 | 61 | 43 |
| Solids, wt. percent of slurry | 8.8 | 7.2 | 8.8 | 7.0 | 7.9 | 7.2 | 7.0 |
| Supercooling, °F | 0.24 | 0.39 | 0.30 | 0.79 | 0.40 | 0.50 | 0.80 |
| p-Xylene Crystal Cake, percent pure | 91 | 84 | 86 | 81 | 85 | 86 | 83 |

[1] Turnovers correspond to cycles.

The above examples demonstrate that use of a combination of a relatively low feed rate and a substantial slurry circulation rate favors the production of high purity p-xylene crystal cakes in the subject process. As a practical matter the feed rate relative to the volume of the circulating slurry must be a reasonable amount, for example, at least about 0.1 volume percent. Relatively high feed rates on the other hand are also satisfactory provided that the operating ratio is sufficiently high. For a given feed rate and a given circulation rate, an increase in the latter operates to reduce the effective feed rate, i.e., a dilution effect. As a practical matter there is of course a reasonable maximum slurry circulation rate which depends upon several conventional practical factors, such as type of pump, size and configuration of the circulated crystallization zone and the like.

What is claimed is:

1. Process for separating p-xylene from a normally liquid xylene-containing hydrocarbon feed from which p-xylene crystals separate as the first solid formed when the feed is cooled, which comprises cooling in a crystallization zone adapted to provide elongated cyclical flow a quantity of said feed to form a slurry of p-xylene crystals in said hydrocarbon liquid, maintaining a body of said slurry in said zone at a temperature in the range below the incipient p-xylene crystallization temperature of said feed and above about −140° F., circulating said slurry in said zone, introducing fresh feed at a rate based upon the volume of said body in the range from about 0.1 to 10 percent per minute into said slurry at a first portion of said zone; introducing inert fluid refrigerant into said slurry at the first or a second portion of said zone in an amount based upon parts by weight of said fresh feed in the range from about 0.1 to about 1 part; withdrawing vaporized refrigerant from a third portion of said zone and withdrawing slurry from a fourth portion of said zone at a rate sufficient to maintain said body and separating p-xylene crystals from said withdrawn slurry.

2. Process as in claim 1 wherein the ratio of the circulating slurry rate to the fresh feed rate is at least about 10.

3. Process as in claim 2 wherein said ratio is in the range from about 50 to 500.

4. Process as in claim 3 wherein said zone is a torroidal loop, said refrigerant is liquid carbon dioxide and said feed contains at least about 10 weight percent of p-xylene.

5. Process as in claim 1 wherein two of said crystallization zones are used in concert in the first of which said slurry-body temperature is maintained in the range from about 10° F., to 54° F. above the eutectic temperature of said feed; cooling a second quantity of said feed in said second zone to about the eutectic temperature of said hydrocarbon feed to form a second slurry of p-xylene crystals in said hydrocarbon feed, maintaining a body of said second slurry in said second zone at about said eutectic temperature, circulating said second slurry in said second zone, introducing at a first portion of said zone said withdrawn first zone slurry as feed to said second zone slurry at a rate based upon the volume of said second body in the range from about 0.1 to 20 percent per minute; withdrawing vaporized refrigerant from a second portion of said second zone by maintaining a second zone system pressure in the range from about 0.1 to 1 atmosphere and withdrawing slurry from a third portion of said second zone at a rate sufficient to maintain said second body and separating p-xylene crystals from said withdrawn slurry.

6. Process as in claim 5 wherein the ratio of the zonal circulating slurry rates to the zonal feed rates are at least about 10.

7. The process as in claim 6 wherein said refrigerant is liquid carbon dioxide, said zones are torroidal loops and said fresh hydrocarbon feed contains at least about 10 weight percent of p-xylene.

8. In a process for the production of crystalline p-xylene from a normally liquid xylene-containing hydrocarbon feed having an eutectic temperature above about −140° F. and from which p-xylene crystals separate as the first solid formed when the feed is cooled, the improvement which comprises cooling a body of said feed to a temperature in the range from about said eutectic to about 54° F. above said eutectic temperature and sufficient to produce at least about 5 parts of crystalline p-xylene per 100 parts of the resulting slurry, circulating a body of said slurry in a circulate crystallization zone; introducing fresh feed into said slurry at a rate of less than about 10 parts per minute per 100 parts of said circulating slurry; introducing an inert fluid refrigerant into said slurry conjointly with said feed or separately at a lower portion of said zone; vaporizing at a separate portion of said zone at least a portion of said refrigerant thereby tending to lower the temperature of said slurry which is maintained at substantially said body temperature by limiting supercooling from said vaporization to an amount less than about 5° F., said limitation being effected by adjusting the weight ratio of said refrigerant to fresh feed in the range from about 0.1–1 part per part, respectively, and withdrawing slurry from a separate portion of said zone at a rate sufficient to maintain said body.

9. Process as in claim 8 wherein two of said circulate crystallization zones are used in concert in the first of which said slurry-body temperature is maintained in the range from about 10° F. to about 54° F. above the eutectic temperature of said feed; cooling a second quantity of said feed in said second zone to about said eutectic temperature to form a second slurry of p-xylene crystals in said feed, circulating a body of said second slurry in said second zone; introducing into said second body said withdrawn slurry from said first zone at a rate of less than about 20 parts per minute per 100 parts of said second circulating slurry; vaporizing at a separate portion of said second zone a further portion of said refrigerant by maintaining a system pressure at said vaporization portion in the range from about 0.1 to 1 atmosphere thereby tending to lower the the temperature of said second slurry which is maintained at substantially said body temperature by limiting supercooling from said second zone vaporization to an amount less than about 5° F., said limitation being effected by adjusting said system pressure in said range and withdrawing slurry from a separate portion of said second zone at a rate sufficient to maintain said body.

10. The process as in claim 9 wherein said zonal supercooling is less than about 2° F.

11. The process as in claim 9 wherein said feed contains at least about 10 weight percent of p-xylene and liquid carbon dioxide is said refrigerant.

12. The process as in claim 1 further characterized in that said withdrawn slurry is passed into a second circulate crystallization zone, thereby establishing a second slurry of p-xylene crystals and mantaining the second slurry at about said eutectic temperature, circulating said second slurry in said second zone, introducing at a first portion of said second zone a further amount of said withdrawn first zone slurry as feed to said second zone at a rate based upon the volume of said second slurry in the range from about 0.1 to 20 percent per minute; withdrawing vaporized refrigerant from a second portion of said second zone by maintaining a second zone system pressure in the range from about 0.1 to 1 atmosphere and withdrawing slurry from a third portion of said second zone at a rate sufficient to maintain said second slurry and separating p-xylene crystals from said withdrawn slurry.

References Cited
UNITED STATES PATENTS

| | | | |
|---|---|---|---|
| 2,766,310 | 10/1956 | Bennett et al. | 260—674 |
| 2,848,519 | 8/1958 | Corneil et al. | 260—674 |
| 2,866,833 | 12/1958 | Spiller | 260—674 |

FOREIGN PATENTS

| | | |
|---|---|---|
| 768,636 | 2/1957 | Great Britain. |

DELBERT E. GANTZ, Primary Examiner

C. E. SPRESSER, Assistant Examiner

U.S. Cl. X.R.

62—58